US008483111B2

(12) United States Patent
Todd et al.

(10) Patent No.: US 8,483,111 B2
(45) Date of Patent: *Jul. 9, 2013

(54) RESOURCE ALLOCATION AND OUTAGE CONTROL FOR RENEWABLE ENERGY WLAN INFRASTRUCTURE MESH NODE

(75) Inventors: Terence Douglas Todd, Hamilton (CA); Amin Farbod, Toronto (CA); Amir Antoun Renne Sayegh, Hamilton (CA)

(73) Assignee: McMaster University, Hamilton, Ontario (CA)

( * ) Notice: Subject to any disclaimer, the term of this patent is extended or adjusted under 35 U.S.C. 154(b) by 262 days.

This patent is subject to a terminal disclaimer.

(21) Appl. No.: 13/021,763

(22) Filed: Feb. 6, 2011

(65) Prior Publication Data

US 2012/0057514 A1 Mar. 8, 2012

Related U.S. Application Data

(63) Continuation of application No. 11/954,819, filed on Dec. 12, 2007, now Pat. No. 7,944,869.

(51) Int. Cl.
*H04B 7/185* (2006.01)
(52) U.S. Cl.
USPC .......................................... 370/311; 370/318

(58) Field of Classification Search
USPC ................................................. 370/311, 318
See application file for complete search history.

(56) References Cited

U.S. PATENT DOCUMENTS

| 6,731,613 | B1 | 5/2004 | Provance |
|---|---|---|---|
| 7,126,945 | B2 | 10/2006 | Beach |
| 7,564,810 | B2 | 7/2009 | Hernandez et al. |
| 2008/0081676 | A1 | 4/2008 | Chakraborty et al. |

*Primary Examiner* — Kenny Lin
(74) *Attorney, Agent, or Firm* — Integral Intellectual Property Inc.; Miriam Paton

(57) ABSTRACT

A mesh node of an infrastructure wireless local area network 'WLAN' is coupled to a battery which is coupled to a device that is able to harness energy from a source of renewable energy. Energy management of the mesh node includes conducting simulations of a system comprising the mesh node, the device, and the battery in its current state of charge, determining an admissible load for the mesh node from the simulations, and withholding communication services by the mesh node for one or more periods of time a cumulative duration of which is related to power consumption of the mesh node when handling the admissible load. The simulations involve meteorological data related to the source of renewable energy in the vicinity of the mesh node.

19 Claims, 16 Drawing Sheets

RESOURCE ALLOCATION AND OUTAGE CONTROL FOR RENEWABLE ENERGY WLAN INFRASTRUCTURE MESH NODE

CROSS-REFERENCE TO RELATED APPLICATIONS

This application is a continuation of U.S. patent application Ser. No. 11/954,819 filed Dec. 12, 2007, entitled "Resource Allocation and Outage Control for Renewable Energy WLAN Infrastructure Mesh Node", which will issue on May 17, 2011 as U.S. Pat. No. 7,944,869, and which is incorporated by reference herein in its entirety.

BACKGROUND

Wireless Local Area Network (WLAN) mesh networks are used to provide IEEE 802.11 coverage using multihop relaying between mesh access points (MAPs) and mesh points (MPs). Throughout this description and claims, the term "mesh node" is used to mean a MAP or a MP or any other suitable component of the mesh network. These networks are currently being standardized under IEEE 802.11s, which intends to promote interoperability between different vendor solutions. One of the major costs of certain WLAN mesh deployments is that of providing MAPs/MPs with electrical power and wired network connections. This is especially true in WiFi hotzones, where coverage is provided over extended outdoor areas. Although power can be supplied through power over Ethernet (POE), such a solution requires a wired network connection, which is often very expensive. For the past several years, the SolarMESH network has been under development and undergoing deployment trials at McMaster University. In SolarMESH, some or all of the mesh nodes are solar powered and completely tetherless, and can be deployed quickly and inexpensively for outdoor WiFi coverage in campuses, building complexes and other WiFi hotzones.

In a solar-powered WLAN mesh, the mesh nodes are photovoltaic (PV) systems which provide reliable operation by achieving a sustainable balance between energy input and output. Node resource allocation includes assigning a panel and battery size to each mesh node. This assignment is very important, since the panel and battery can be a significant fraction of the total cost, especially in temperate regions. If a mesh node is overprovisioned, its cost may be unnecessarily high. If a mesh node is underprovisioned, outages may occur. The sizing of photovoltaic systems has been extensively studied in the literature.

BRIEF DESCRIPTION OF THE DRAWINGS AND APPENDICES

Embodiments are illustrated by way of example and not limitation in the figures of the accompanying drawings, in which like reference numerals indicate corresponding, analogous or similar elements, and in which.

Appendix is a discussion of solar radiation data and models.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A renewable energy WLAN infrastructure mesh node implements a control algorithm to ensure that it has sufficient power to provide a minimum level of performance (for example, the ability to make emergency calls) while offering enough capacity to satisfy customer demands to the extent possible. A device to harness energy from a source of renewable energy is coupled to a battery, which in turn is coupled to the mesh node. Although the examples described below refer to the example where the source of renewable energy is the sun, meteorological data related to the source of renewable energy is solar insolation data, and the mesh nodes are solar powered mesh nodes, in which the device is a solar panel, the same principles may be applied to other sources of renewable energy, including, for example, wind power.

Figure 1:
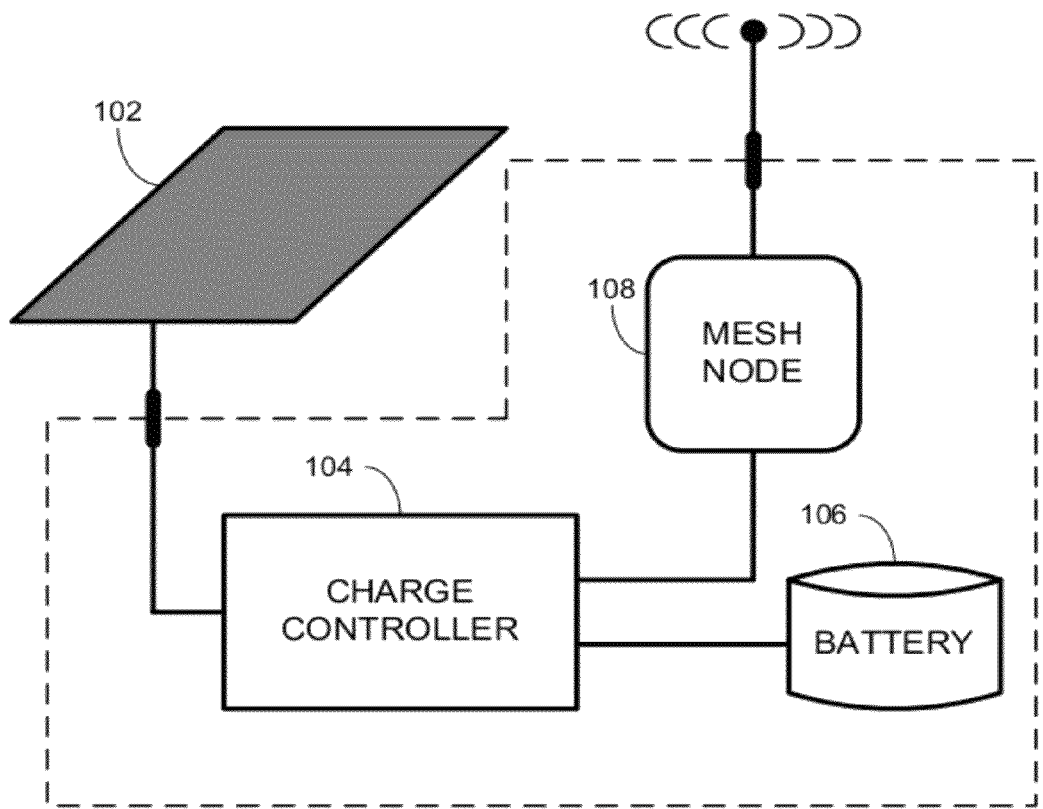
FIG. 1 is a simple block diagram of an exemplary renewable energy WLAN infrastructure mesh node.

FIG. 1 shows a simplified block diagram of an exemplary solar powered WLAN infrastructure mesh node. A solar panel 102 is coupled via a charge controller 104 to a battery 106. A mesh node 108, for example, a mesh access point or a mesh point, is coupled to battery 106 via charge controller 104. If at any time the energy stored in battery 106 falls below a certain threshold, $B_{OUTAGE}$, charge controller 104 disconnects mesh node 108 from battery 106. This disconnection is known as an "outage". $B_{OUTAGE}$ is the maximum allowed depth of discharge, based on safety and battery life considerations. Charge controller 104 also performs functions such as battery over-charge protection.

Provisioning the Mesh Node

An energy flow model can be used to determine what size solar panel and what total battery capacity to select. The solar panel size is given by $S_{PANEL}$, and is usually rated in watts at peak solar insolation. $B_{MAX}$ is defined to be the total battery capacity.

In the energy flow model, $\epsilon_{PANEL}(k)$ is defined to be the energy produced in the solar panel over the time increment $[(k-1)\Delta, k\Delta]$, where $\Delta$ is the time-step length considered. Using publicly available meteorological data, data collection and modeling is done in discrete time, and more than sufficient accuracy is usually obtained using 1 hour $\Delta$ increments.

If $L(k)$ is assumed to be the load energy demand over the time duration $[(k-1),\Delta,k\Delta]$, then according to the energy flow model, the residual battery energy, $B(k)$, stored at time $k\Delta$ is approximated by the following iterative equation:

$$B(k)=\min\{\max[B(k-1)+\epsilon_{PANEL}(k)-L(k),B_{OUTAGE}], B_{MAX}\} \quad (1)$$

where $k=0, 1, \ldots, k_{MAX}$ ranges over the entire set of solar irradiation samples taken for a given geographic location. Available data of this kind typically spans several decades of continuous measurements. The above model is easily modified to incorporate more sophisticated battery models such as those that include temperature effects.

Resource allocation for the mesh node consists of assigning the values of $B_{MAX}$ and $S_{PANEL}$ to the node. When this configuration is performed, a load profile for each node is determined. The load profile is a time function which represents the peak or average workload for which the node in question is designed. For a given geographical location, public meteorological data is then used to design the node subject to a target outage probability. For a given power dissipation workload, a continuum of battery and panel sizes can be determined and a cost-optimal assignment can be found. Using data for Toronto, Canada, for example, the approximate cost-optimal panel and battery sizes are shown in Table 1 for a (short-term) average power consumption of 2 Watts, where $P_{OUTAGE}$ is the outage probability.

TABLE 1

Example Optimum Price Panel/Battery Configurations for Different Load Profiles, Toronto Canada

| $P_{OUTAGE}$ | $B_{MAX}$(A-h) | $S_{PANEL}$ (Watts) |
|---|---|---|
| $10^{-2}$ | 20.0 | 31.6 |
| $10^{-3}$ | 30.1 | 38.0 |
| $10^{-4}$ | 40.6 | 38.0 |

Power Saving in the Mesh Node

Power consumption is a major factor affecting the node cost due to the panel/battery configuration. IEEE 802.11 does not include native procedures that would allow an access point to achieve power saving. In classical IEEE 802.11, power saving has dealt with end user stations, since access points are assumed to have continuous power connections and assumed to always be active on their assigned channel. "Access Point Power Saving in Solar/Battery Powered IEEE 802.11 ESS Mesh Networks" by Y. Li, T. D. Todd and D. Zhao, *The Second International Conference on Quality of Service in Heterogeneous Wired/Wireless Networks* (*QShine*), August 2005 proposes a power saving WLAN mesh architecture based on simple extensions to IEEE 802.11e. In conventional IEEE 802.11, access points (APs) broadcast beacon packets periodically to announce the presence of the access point and to maintain synchronization with its associated stations. In the proposed power saving protocol, the AP includes a network allocation map (NAM) in its beacon broadcasts which specifies periods of time within the superframe when it is in a power saving state.

Embodiments of this invention assume that such power saving techniques are available and therefore, the mesh node can choose to force a level of power saving activity regardless of mobile station transmission requirements. This is referred to herein as forced power saving (FPS). When FPS is used the bandwidth offered by the mesh node is artificially reduced and when this is less than that required by the load, the system incurs a capacity deficit.

Figure 2:
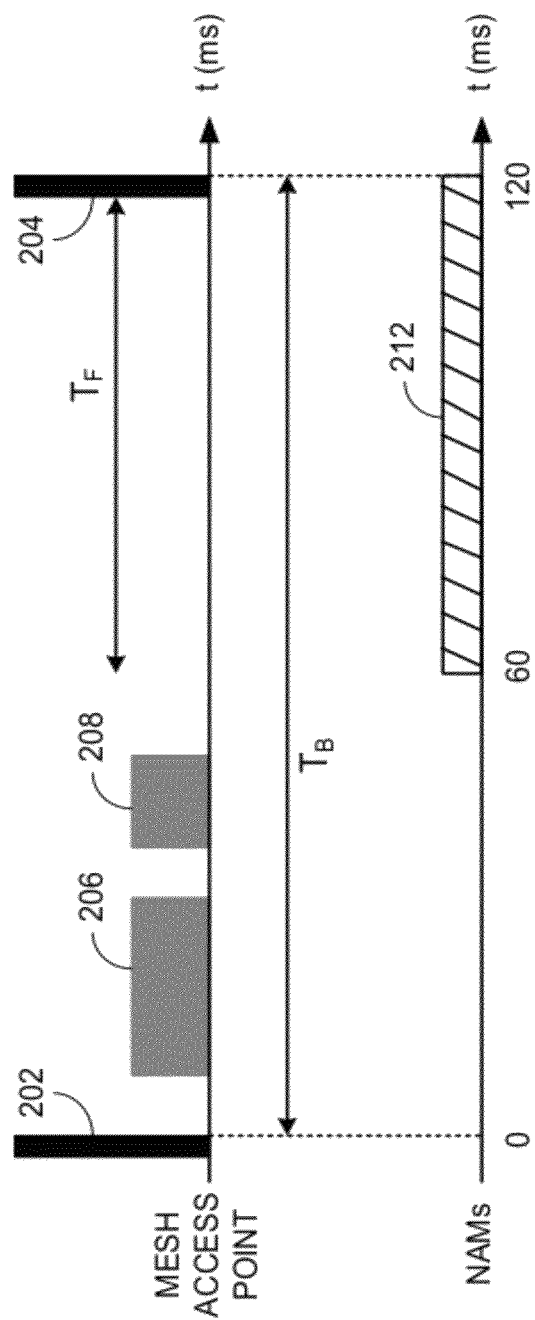
FIG. 2 is an exemplary simplified timing diagram of events in a wireless infrastructure mesh network.

An example of this is shown in FIG. 2, which is an exemplary simplified timing diagram of events in a wireless infrastructure mesh network. A mesh access point transmits beacon frames, for example, beacon frame 202 and beacon frame 204 at an inter-beacon period $T_B$. Enhanced Distributed Channel Access (EDCA) and/or HCF (Hybrid Coordinator Function) Controlled Channel Access (HCCA) activity occurs during time periods 206 and 208. Suppose that the mesh access point, for the purpose of forced power savings, advertises a NAM that restricts the activity of the mesh access point to a maximum of 50% of the inter-beacon interval. The NAM includes boundaries that define time periods whose total time (per inter-beacon period) is $T_F$. In the example shown in FIG. 2, a single time period 212 of duration $T_F$ is shown. The normalized offered capacity is defined by $$OC = 1 - \frac{T_F}{T_B}. \quad (2)$$

Control Algorithms in the Mesh Node

IEEE 802.11 mesh nodes will normally be provisioned for negligible outage. When a mesh node's workload exceeds its provisioning, the node should sometimes assume a degraded mode of operation in order to prevent outage. In addition to the zero outage requirement, there is an additional constraint that the normalized offered capacity should never drop below some acceptable design value, $U_{MIN}$, otherwise the operation of the mesh node would be too impaired. As long as the battery stores sufficient energy for the normalized offered capacity to meet or exceed $U_{MIN}$, a minimum level of performance is ensured.

The problem of efficient control can be formulated as a stochastic control problem. As before, $L(k)$ is defined to be the energy loading of the mesh node during the time interval $[(k-1)\Delta,k\Delta]$. The actual energy loading on the mesh node during $[(k-1)\Delta,k\Delta]$ is then defined to be $\epsilon_A(k)$. In the absence of any control, $\epsilon_A(k)=L(k)$, but when a control mechanism is in place, the activity level of the mesh node may sometimes be artificially reduced to save power, i.e., $$\epsilon_A(k)=\min(L(k),\epsilon_{MAX}(k)), \quad (3)$$

when $\epsilon_{MAX}(k)$ is a control variable that specifies the maximum energy consumption in the next interval. The actions of the control variable lead to an energy deficit $\epsilon_{DEF}(k)$, defined by $$\epsilon_{DEF}(k)=L(k)-\epsilon_A(k). \quad (4)$$

$\epsilon_A(k)$ is not permitted to drop below the value needed to provide the $U_{MIN}$ mesh node activity level, i.e. $\epsilon_A(k) \geq F(U_{MIN})$, where the function F translates the average activity of the mesh node into an average energy consumption over the time interval $[(k-1)\Delta,k\Delta]$.

The objective of the control scheme is to satisfy the target outage rate while reducing the capacity deficit as much as possible. For a given loading condition, the optimum control scheme is to select $\epsilon_A(k)$ for all k, such that the energy deficit over all time is minimized, i.e., $$\min_{\{\varepsilon_{MAX}(k)\}} \sum_{k=0}^{k_{MAX}} \varepsilon_{DEF}(k) \tag{5}$$

subject to $$B(k) = \min\{\max[B(k-1) + \epsilon_{PANEL}(k) - \epsilon_A(k), B_{OUTAGE}], B_{MAX}\} \tag{6}$$

$$P_r\left\{\bigcap_k (B(k) \geq B_{OUTAGE})\right\} \geq 1 - P_{OUTAGE}, \tag{7}$$

and $$\epsilon_A(k) \geq F(U_{MIN}) \tag{8}$$

Equation 6 is the modified energy flow equation for the system, Equation 7 is the outage requirement, and Equation 8 is the constraint on minimum mesh node energy or capacity. Normally the mesh node will be designed to a zero outage probability target and in this case Equation 7 is equivalent to the requirement that $B(k) > B_{OUTAGE}$, for all k. Unfortunately Equation 5 describes an extraordinarily hard optimal control problem.

On/Off Capacity Deficit Control

One method of control is to implement in the mesh node a classic on/off controller which restricts the activity of the mesh node to $U_{MIN}$ whenever the battery state of charge falls below a threshold, denoted by $L_{TH}$. The basic on/off controller sets the maximum energy that will be available in the next time step, $\epsilon_{MAX}(k)$, as follows, $$\varepsilon_{MAX}(k) = \begin{cases} P_{Max}\Delta, & B(k) \geq L_{TH} \\ P_{U_{MIN}}\Delta, & B(k) < L_{TH}, \end{cases} \tag{9}$$

where the term $P_{MAX}\Delta$ represents the peak energy that the mesh node can dissipate over $\Delta$, and the term $P_{U_{MIN}}$ represents the worst-case power consumption of the mesh node when operating at $U_{MIN}$.

The actions of the controller are specified in terms of mesh node energy usage constraints, and in practice this must be translated into radio/node activities. A simple way to do this is to assume the worst-case power consumption of the mesh node, $P_{MAX}$, and translate that into a maximum activity level per superframe. Assuming that the quiescent power consumption of the mesh node is $P_{MIN}$, then it can easily be shown that the maximum fraction of time that the mesh node can be active during interval k is given by $$OC(k) = \frac{\varepsilon_{MAX}(k) - \Delta P_{MIN}}{\Delta(P_{MAX} - P_{MIN})}, \tag{10}$$

Alternatively, a more sophisticated model of the mesh node activity can be used. Equation 10 expresses the normalized offered capacity, and Equation 2 can be used with this expression to determine the total forced power saving time per inter-beacon period that corresponds to this normalized offered capacity.

Figure 3:
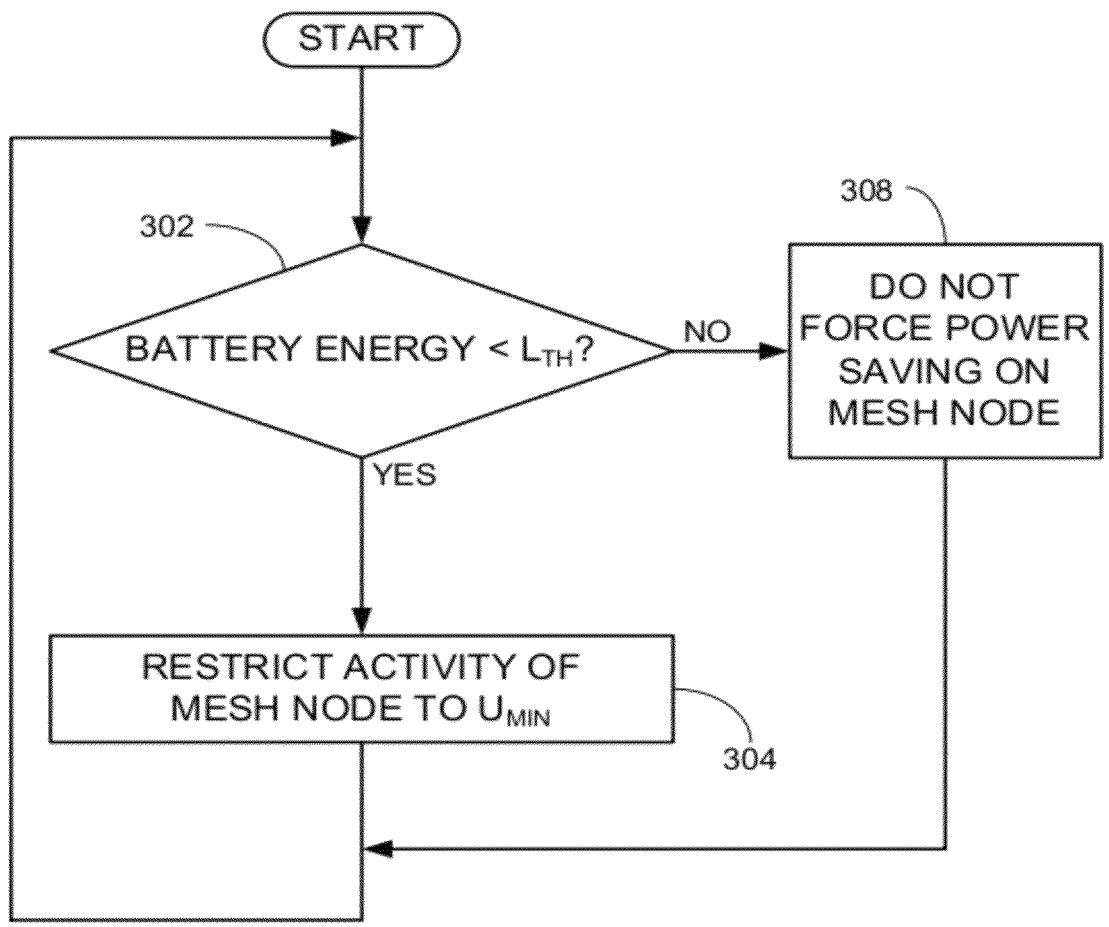
FIGS. 3 and 4 are flowcharts of exemplary control methods for preventing outages.

FIG. 3 is a flowchart of an exemplary control method for preventing outages in mesh node 108. At 302, it is checked whether the residual energy stored in battery 106 has fallen below a threshold, denoted by $L_{TH}$. If so, then at 304, then the activity of mesh node 108 is restricted to $U_{MIN}$. As explained above, this restriction is effected by restricting the time that the mesh node is available to provide communication services to other nodes or mobile stations in the network. The duration of time during which the mesh node is forced to be unavailable, that is, during which the mesh node withholds communication services, may be determined from a model for the normalized offered capacity. The method then resumes from 302, possibly after a period of time during which it waits. If at 302 the residual energy stored in battery 106 has not fallen below the threshold $L_{TH}$, then forced power saving is not applied, as indicated at 308.

Gradual Capacity Deficit Control

With the on/off controller described above, the transition into active control occurs very abruptly. Another method of control is to implement in the mesh node a controller which gradually restricts the activity of the mesh node as the battery energy reserves decrease.

For example, the controller may set the maximum energy that will be available in the next time step, $\epsilon_{MAX}(k)$, as follows, $$\varepsilon_{MAX}(k) = \begin{cases} P_{Max}\Delta & B(k) > U_{TH} \\ P_{U_{MIN}}\Delta & B(k) < L_{TH} \\ P_{MAX}\Delta - C(U_{TH} - B(k)), & \text{otherwise,} \end{cases} \tag{11}$$

where $U_{TH}$ denotes an upper threshold above which no control is performed, and C is a constant that controls how aggressively energy consumption of the mesh node is curtailed as the battery's state of charge drops. For example, C may be given the value $\Delta(P_{MAX} - P_{U_{MIN}})/(U_{TH} - L_{TH})$, so that the transition is piece-wise continuous. Any monotonically decreasing function in $(U_{TH} - B(k))$ may be used instead of the linear function given above.

Figure 4:
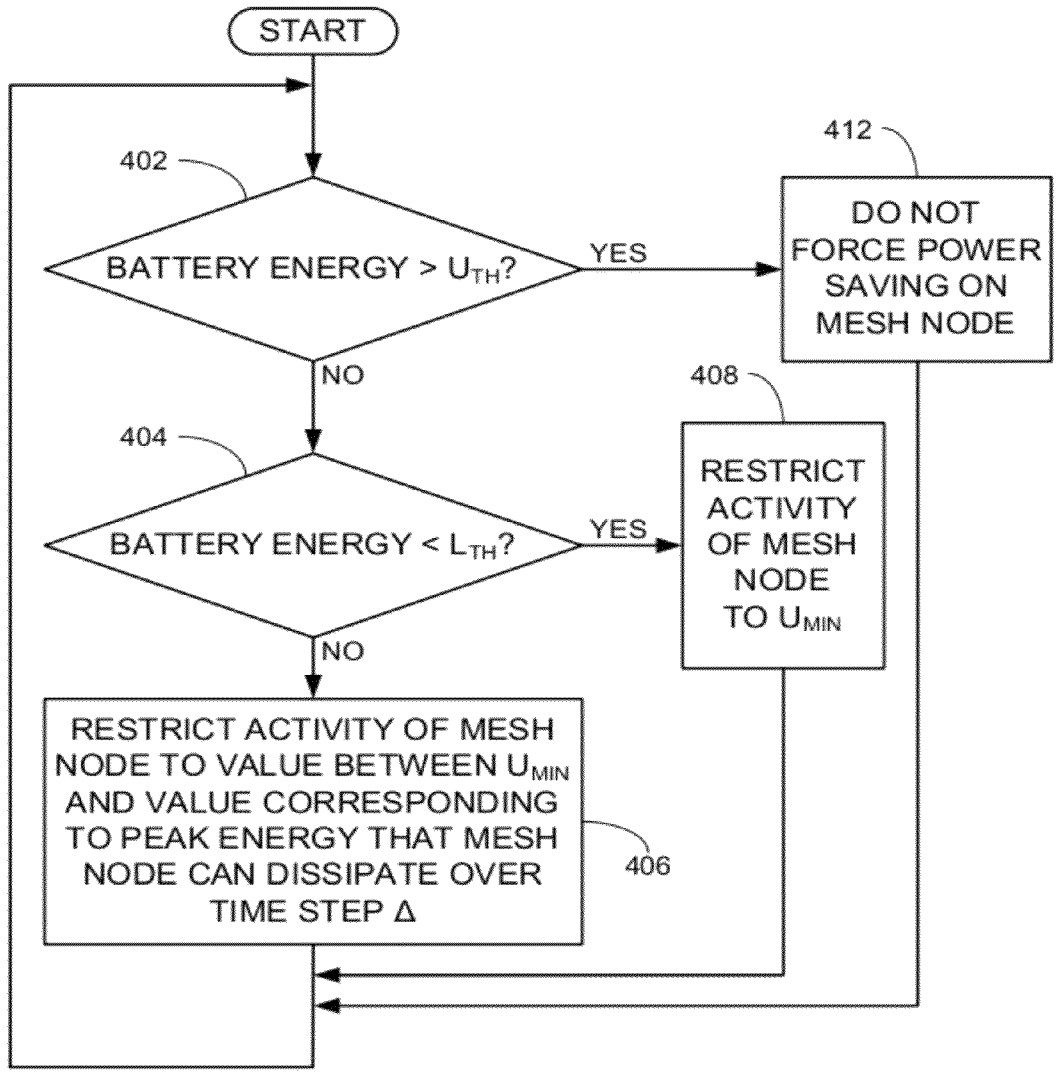

FIG. 4 is a flowchart of another exemplary control method for preventing outages in mesh node 108. At 402, it is checked whether the residual energy stored in battery 106 exceeds an upper threshold, denoted by $U_{TH}$. If not, then at 404 it is checked whether the residual energy stored in battery 106 has fallen below a lower threshold, denoted by $L_{TH}$. If so, then at 408, the activity of mesh node 108 is restricted to $U_{MIN}$. If not, then at 406, the activity of mesh node 108 is restricted to a value between $U_{MIN}$ and the value corresponding to the peak energy that mesh node 108 can dissipate over the time step $\Delta$. The method then resumes from 402, possibly after a period of time during which it waits. If at 402 the residual energy stored in battery 106 exceeds the threshold $U_{TH}$, then forced power saving is not applied, as indicated at 412.

As explained above, the restrictions in the mesh node's activity are effected by restricting the time that the mesh node is available to provide communication services to other nodes or mobile stations in the network. The duration of time during which the mesh node is forced to be unavailable, that is, during which the mesh node withholds communication services, may be determined from a model for the normalized offered capacity.

Selection of Lower Threshold $L_{TH}$

The selection of lower threshold $L_{TH}$ is important. If $L_{TH}$ is too low, then outages may occur. If $L_{TH}$ is too high, then services may be unnecessarily degraded. There are various options for selecting lower threshold $L_{TH}$.

One option, for example, is to select $L_{TH}$ when the mesh node is configured using the meteorological data for that location. Assume a full battery and a fixed load corresponding to $U_{MIN}$. Simulate the system using Equation 1 and find the lowest battery state of charge. Since this minimum should not correspond to an outage, one minus this value is then used as the threshold, $L_{TH}$. For example, if the simulation yields a lowest B(k) of about 94%, then the lower threshold $L_{TH}$ may be set to 6%.

Another option, for example, is choose a control scheme, for example, on/off control or gradual control, and to choose $U_{MIN}$. Then the system is simulated using the appropriate Equation 9 or 11 for different values of $L_{TH}$. The value of $L_{TH}$ that yields the best performance (measured, for example, in not exceeding the target outage probability and in reducing the capacity deficit) is used.

Calculation of Energy Using Dynamic Access to Meteorological Data

An alternative to the methods of FIGS. 3 and 4 is at discrete time intervals to calculate, based on simulations, what energy mesh node 108 is willing to consume over the next period of time until the next calculation. Once that calculation has been made, the appropriate duration of forced power savings can be determined and network allocation map (NAM) boundaries determined.

This calculation may be performed at mesh node 108 or may be performed on a server to which mesh node 108 has access via the WLAN mesh network. This latter option may be desirable since the required simulation may be very labor intensive in terms of communication bandwidth, node power consumption, and other resources. Performing this computation on a networked server may conserve considerable energy at the mesh node. Mesh node 108 may provide the server with some of the data on which the calculation is based (e.g. an indication of the current state of charge of the battery) and receive in return from the server indications of the calculated energy or load or time or boundaries, or information from which such data can be determined. If the calculation is performed on the server, then instructions stored on a computer-readable medium are executed by the server to receive from mesh node 108 some of the data on which the calculation is based, to perform the calculation, and to provide mesh node 108 with the calculated energy or load or time or boundaries or information from which such data can be determined. Computer-readable media can be any available media that can be accessed by a general-purpose or special-purpose computer. By way of example, and not limitation, such computer-readable media may comprise physical computer-readable media such as RAM, ROM, EEPROM, flash memory or other memory technology, CD-ROM, DVD or other optical disk storage, magnetic disk storage or other magnetic storage devices, or any other medium which can be used to carry or stored desired program code means in the form of computer-executable instructions or data structures and which can be accessed by a general-purpose or special purpose computer. When information is transferred or provided over a network or another communications connection (hardwired, wireless, optical or any combination thereof) to a computer system, the computer system properly views the connection as a computer-readable medium. Thus, any such connection is properly termed a computer-readable medium. Combinations of the above should also be included within the scope of computer-readable media.

A description of an exemplary method follows. At each decision point, k, the node may decide what energy it is willing to consume over the next $\Delta$ time increment, [(k−1)$\Delta$, k$\Delta$] (e.g. $\Delta$ is one hour). Using solar insolation data, simulation runs of the energy balance equation are done for W time increments into the future from the current hour p. The results of these simulation runs are used to determine the energy that can be offered over this time increment. If the calculations are performed at mesh node 108, mesh node 108 accesses the solar insolation data via the WLAN mesh network. If the calculations are performed at a server to which mesh node 108 has access via the WLAN mesh network, then it is assumed that the server has access to the solar insolation data, for example, via the Internet.

In one embodiment, forecasted solar insolation data is used in the simulation. A simulation based on Equation 1 is performed, from p to p+W hours into the future. This allows the method to examine the system state over the window of prediction, i.e. [p, p+W] using the data in question. Once the battery state of charge values are generated W hours into the future, they can be examined in order to make a decision on the admissible load. The controller sets a threshold $L_{TH}$ on the battery state of charge, and finds the lowest point $\delta$ below $L_{TH}$ in the simulated run. The controller then sets the admissible load to be the original demand load reduced so that the lowest point is above $L_{TH}$. The admissible load will be termed "admissibleload". If the admissible load is less than the load corresponding to $U_{MIN}$, the admissible load is set to the load corresponding to $U_{MIN}$, since the priority is to always supply $U_{MIN}$ as discussed hereinabove.

Another embodiment exploits solar cyclostationarity, uses an historical database of solar insolation data, and indexes each year in $\Delta$ time increments (e.g. $\Delta$ is one hour). It then accepts as an input the current hour p, the window of prediction W, and the load that is being considered for admission, i.e. "originalload". At the corresponding time p in the historical database, the controller performs a simulation based on Equation 1 for a given past year, from p forward to p+W hours. This allows the method to examine the system state over the window of prediction, i.e. [p, p+W] using the data in question. This procedure is repeated for multiple years in the meteorological database for this location. Once the battery state of charge values, "BatteryCharge(i)", are generated W hours into the future, they can be examined in order to make a decision on the admissible load. In one embodiment, the controller sets a threshold $L_{TH}$ on the battery state of charge, and finds the lowest point $\delta$ below $L_{TH}$ in the simulated run. The controller then sets the admissible load to be the original demand load reduced so that the lowest point is above $L_{TH}$. If the total admissible load is less than the load corresponding to $U_{MIN}$, the total admissible load is set to the load corresponding to $U_{MIN}$, since the priority is to always supply $U_{MIN}$ as discussed hereinabove. Finally, the ensemble average value of the admissible load across all the years available on record is taken and this will be the load actually admitted by the system.

In order to improve the outcome of the simulations and the system controller action, it may be helpful to improve the quality of the data being forecasted. The data is used by the prediction algorithm as an input to the simulations. There are several prediction algorithms available and they are referred to herein as "the prediction algorithm". The data to be forecasted may include, but is not restricted to, the weather conditions and the load profile. There are several ways to perform the forecasting, and the AP could perform the forecasting in a stand-alone fashion without accessing any external data. In this case, the AP could rely on pre-programmed or dynamic coefficients which are used within the context of the prediction algorithm to perform the prediction several time steps into the future. The pre-programmed coefficients could be generated from available historical data. For example, known load profiles and solar insolation, etc. The dynamically updated coefficients could be generated based on the data being collected by the AP over a statistically sufficient period of time preceding the prediction period. The method could also perform the calculations by combining the pre-programmed coefficients and the dynamically updated coefficients, thus making use of historical data and current data at the same time. To conserve power and other mesh node resources, the processing could be offloaded to an external server. In this case, the mesh node would periodically report the parameters being collected locally to the server. The server would report back to the mesh node the parameters such as the admissible load, etc. One possible hybrid method would be to combine publicly available forecasted data with locally measured data from the mesh node. In this case, the forecasted data would represent the long term trends and averages while the AP would provide adaptive refinement based on actual condition at its spatial location. Finally, any combination of one or more of the above-mentioned schemes would be considered a viable alternative that would produce satisfactory results. In addition, more than one prediction algorithm may be combined in order to improve the simulation results.

In yet other embodiments, a combination of historical solar insolation data and forecasted solar insolation data is used in the simulations and calculations.

| Exemplary Control Method |
|---|
| Current time = p |
| W = 24 |
| for j = 1 to Number of years do |
|     for i = p+1 to p+W do |
|         Run energy balance equation for year j for hour i |
|         if BatteryCharge(i) < $L_{TH}$ then |
|             $\delta(i) = L_{TH} -$ BatteryCharge(i) |
|         else |
|             $\delta(i) = 0$ |
|         end if |
|     end for |
|     admissibleload(j) = originalload − $\max_i\{\delta(i)\}$ |
|     if admissibleload(j) < $U_{MIN}$ then |
|         admissibleload(j) = $U_{MIN}$ |
|     end if |
| end for |
| Return average of admissible load over j |

Performance Results—On/Off Capacity Deficit Control and Gradual Capacity Deficit Control Many experiments in resource allocation and capacity deficit control were performed. The solar panel was assumed to be fixed and tilted facing toward the equator, and the solar models used are briefly discussed in the Appendix. A non-ideal, temperature dependent battery model with an initial complete battery state of charge was assumed. In the experiments the meteorological data for a location is partitioned into two, so that one can be used for the design, and the other can be used when simulating the system under test. For example, data from even years may be used for the design, and data from odd years may be used for the simulations. The results of the experiments indicated that the performance of the AP is independent of the traffic type or arrival process, provided that the average power consumption of the AP is the same. This is to be expected since the battery/panel integrates AP power consumption over long time periods. For this reason, the results of the experiments are presented results as a function of average AP loading.

One factor in the design of the system is the Averaged Offered Capacity Profile (AOCP). AOCP(.) is defined to be a time function which spans a single year, i.e. AOCP(k) is defined to be the ensemble average over all years of the offered capacity that the system is designed for, over the interval of time $[(k-1)\Delta, k\Delta]$. In practice, there will be uncertainty as to how to predict AOCP(.) and in some cases, worst-case values may be chosen. As in other capacity deployment situations, designers will often have a good idea of reasonable profiles through experience with similar deployments. The particular value of AOCP(k) does not mean that this is the peak capacity that is offered to users of the AP throughout $[(k-1)\Delta, k\Delta]$. Rather, AOCP(k) specifies an ensemble average AP activity level over that period.

Figure 5A:
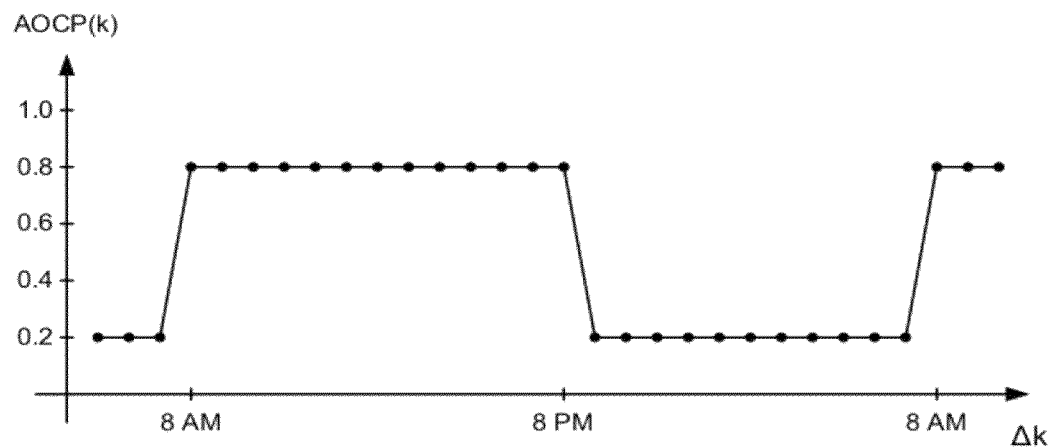
FIGS. 5A and 5B are graphs of exemplary daily averaged offered capacity profiles.
Figure 5B:
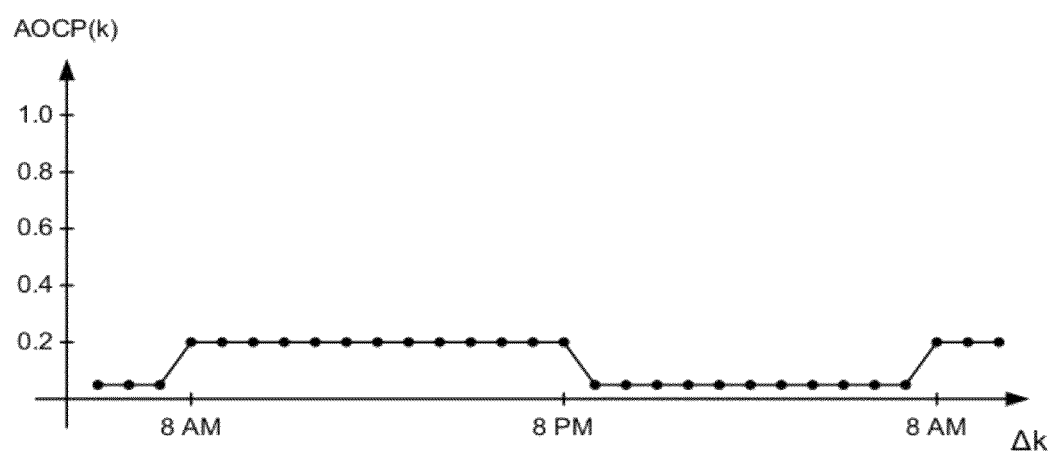

FIGS. 5A and 5B are graphs of exemplary daily AOCP for an outdoor AP. The profiles are normalized so that a value of 1 corresponds to full utilization (and power consumption) of the AP. In the example of FIG. 5A, the average offered AP capacity during daytime hours (8 AM to 8 PM) is 0.8 and drops to 0.2 during nighttime hours when mobile users are not expected to be present in this outdoor coverage area. In the example of FIG. 5B, the AOCP during daytime hours is 0.2 and drops to 0.05 during nighttime hours.

Using the design methodology described herein, the performance of a solar powered AP was simulated over the meteorological history of various locations. It was assumed that the maximum power consumption of the AP, $P_{MAX}$, is 1 W and that the minimum power consumption of the AP, $P_{MIN}$, which occurs when the radio interface (and other electronics) are in a low power sleep/doze mode, is 20 mW.

Based on battery/panel contour plots, the optimum configuration was determined using a battery/panel cost ratio of 0.51. This value was taken from current typical retail price figures. The optimum price panel and battery sizes for three different outage probability targets are compared in Table 2 for Toronto, Canada. In a first set of designs, the Averaged Offered Capacity Profile, AOCP1, is as shown in FIG. 5A. In a second set of designs, the Averaged Offered Capacity Profile, AOCP2, is as shown in FIG. 5A for May-September and as shown in FIG. 5B for October-April. This second set is meant to model seasonal drops in usage that would be expected in temperate climates. In Toronto, Canada, for example, many outdoor Wi-Fi hotzones would incur very little usage during winter months compared with that expected at other times of the year.

TABLE 2

Example Optimum Price Panel/Battery Configurations for Different Load Profiles, Toronto Canada

| | No Power Saving | | Power Saving - AOCP1 | | Power Saving - AOCP2 | |
|---|---|---|---|---|---|---|
| $P_{OUTAGE}$ | $B_{MAX}$ (A-h) | $S_{PANEL}$ (Watts) | $B_{MAX}$ (A-h) | $S_{PANEL}$ (Watts) | $B_{MAX}$ (A-h) | $S_{PANEL}$ (Watts) |
| $10^{-2}$ | 20.0 | 31.6 | 11.0 | 16.7 | 4.4 | 6.0 |
| $10^{-3}$ | 30.1 | 38.0 | 15.7 | 20.0 | 7.8 | 7.0 |
| $10^{-4}$ | 40.6 | 38.0 | 20.9 | 20.0 | 13.1 | 7.0 |

Note that $10^{-4}$ corresponds to a negligible outage rate, and would often be the target in practical WLAN mesh designs. A comparison between conventional non-power saving APs and designs based on protocol AP power saving for AOCP1 show that there is a 2:1 reduction in both panel size and in battery size for the same outage probability target. This cost reduction is very significant and would lead to a much more price competitive product. It should be noted that AOCP 1 is not considered to be an atypical case, and many lower AP utilizations would be expected in practical outdoor systems.

In the AOCP2 example, the non-winter AP usage is identical to AOCP1, but during winter months the average utilization drops significantly. It can be seen from Table 2 that this usage behavior allows further significant reductions in AP resources. In the $10^{-4}$ case, for example, batteries/panels may be used that are 62% and 35% that of the AOCP1 case. The seasonal usage improvement is very significant since clearly the winter months in temperate locations is dictating the resources needed to achieve a given outage target. This is caused by reduced solar insolation and temperature-dependent battery effects that are strong during these periods. Again it is important to emphasize that these gains are made possible by the protocol-based AP power saving.

Figure 6:
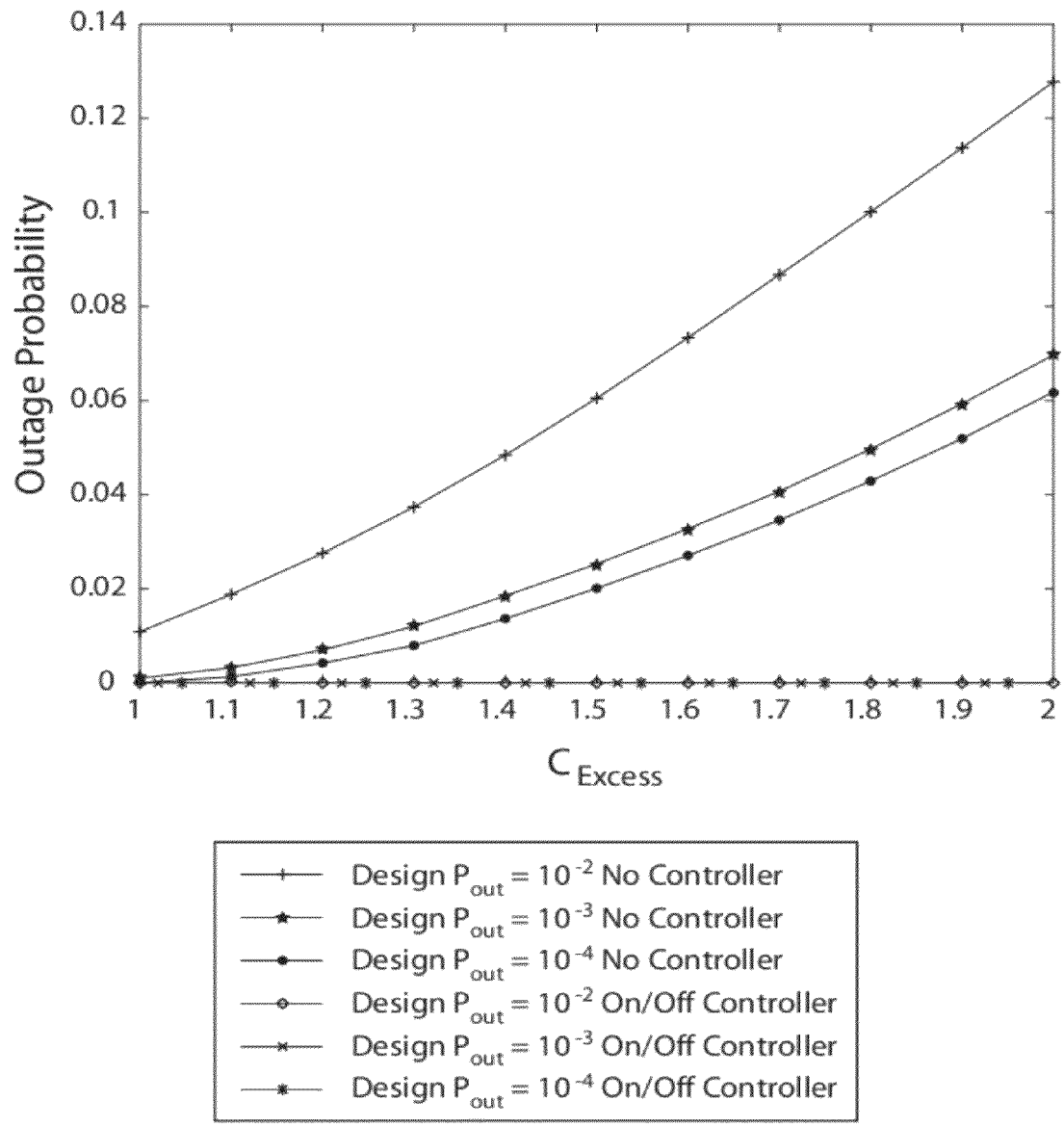
FIGS. 6 and 8 are graphs of exemplary outage probabilities versus an excess loading of an access point.
Figure 7:
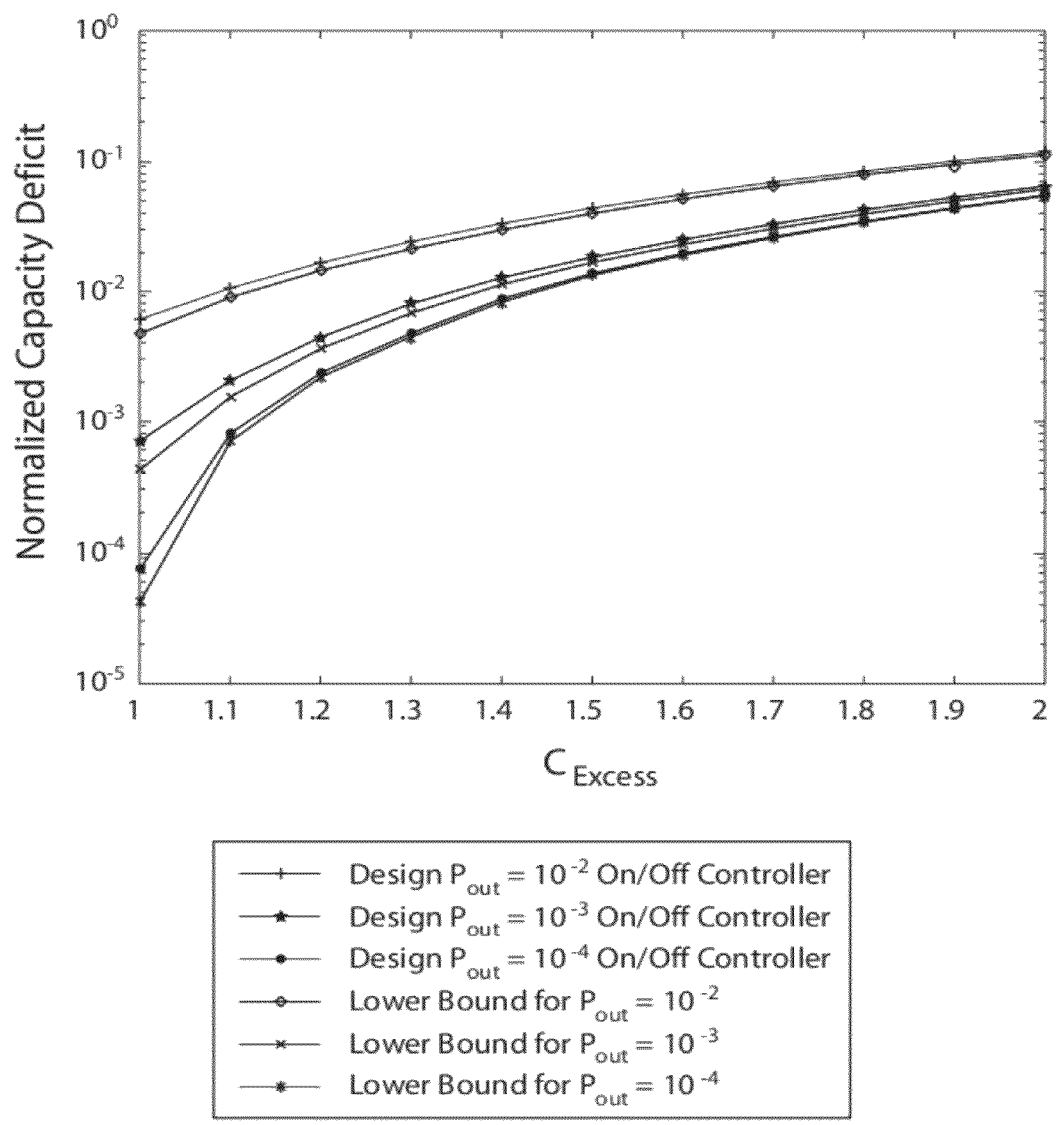
FIG. 7 is a graph of exemplary capacity deficits versus an excess loading of an access point.

The negative aspect of the resource allocation method is that it may increase an access point's outage sensitivity to workloads that exceed its design. In FIGS. 6 and 7, results are given for an AP using $P_{MAX}=2$ W. FIG. 6 shows the outage probabilities assuming a constant AOCP of 0.5. In these figures, the actual AP loading is the factor $C_{EXCESS}$ times that for which the system was designed. In these results $U_{MIN}$ is assumed to be 10% and $B_{OUTAGE}$ is 0.1067 (or 11% of the battery capacity). The three upper curves correspond to the outage probabilities for different outage targets when there is no control being used. It can be seen that the outage probabilities rise sharply with excess load starting from values close to the original design outage targets. At twice the excess loading factor, a system designed for negligible outage is experiencing more than a 6% outage rate. The other three curves in FIG. 6 correspond to the case where the on/off controller is active. These systems all experience zero outage. It can be seen that even an AP designed for a $10^{-2}$ outage probability experiences zero outage when $C_{EXCESS}=2$.

FIG. 7 shows the price paid for eliminating outage in terms of capacity deficit. The cases shown correspond to when the on/off control is active, and show that capacity deficit increases significantly with excess load. In the $10^{-4}$ outage design the capacity deficit reaches about 5% of the total capacity when operating with 200% excess loading, a value which is a small fraction of the total capacity. Also included in this figure is a lower bound on capacity deficit. It can be seen that the difference is very small, especially when the excess load increases. This is very encouraging since it indicates that the proposed outage control mechanisms are performing well compared with theoretical lower bounds.

Figure 8:
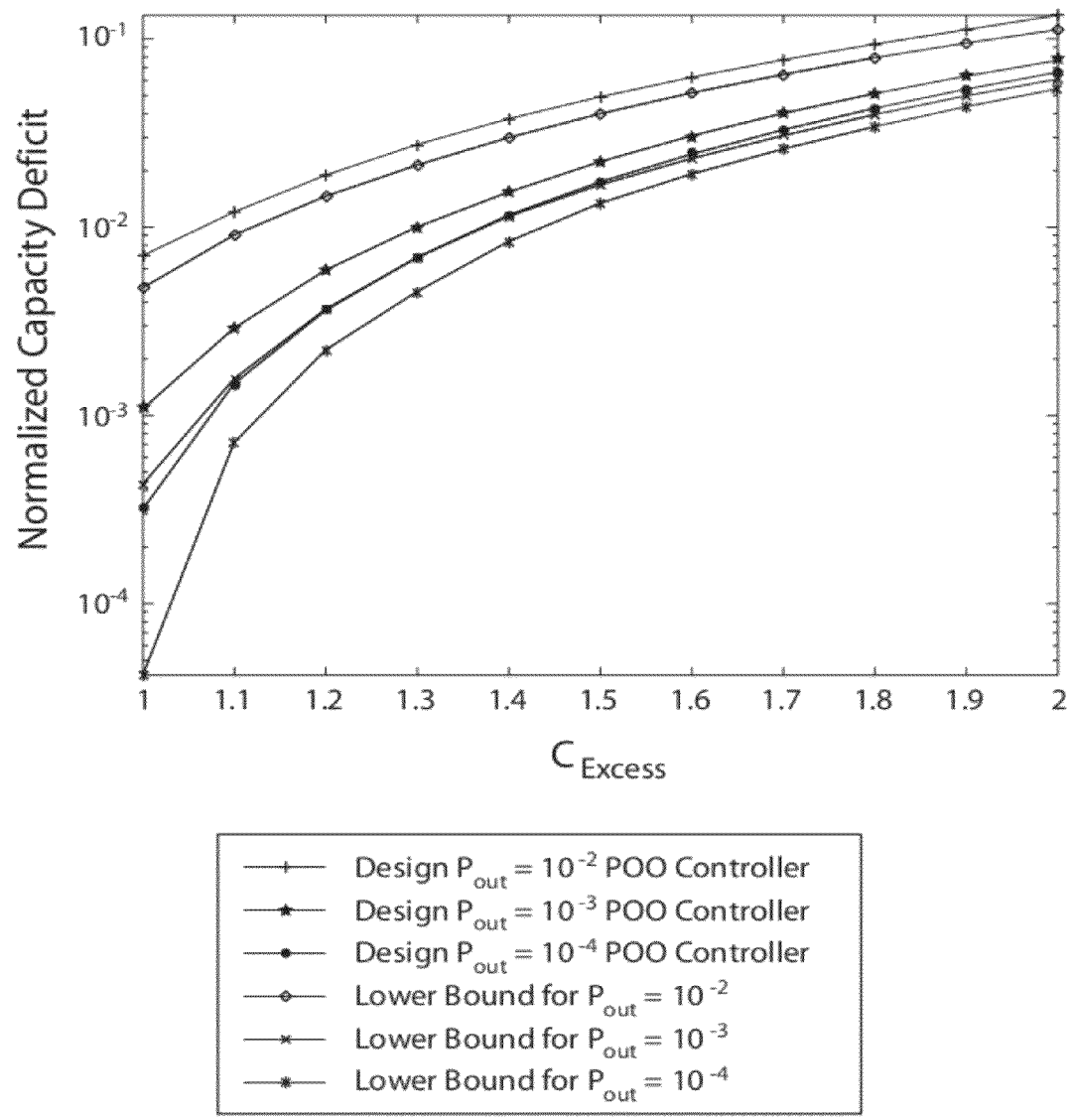

FIG. 8 shows the same graph when a gradual capacity deficit controller is used. It can be seen that the behavior is similar, but that the values of capacity deficit are higher overall than in the on/off case. This is to be expected since the gradual capacity deficit control is more aggressive at forcing power saving as the battery reserves decrease. However, it can still be seen that at 200% load, roughly the same value is achieved as in the on/off case for the $10^{-4}$ curve. The figure also shows that the performance is farther from the lower bound that in the previous case. This is to be expected since this algorithm introduces capacity deficit much more proactively.

Figure 9:
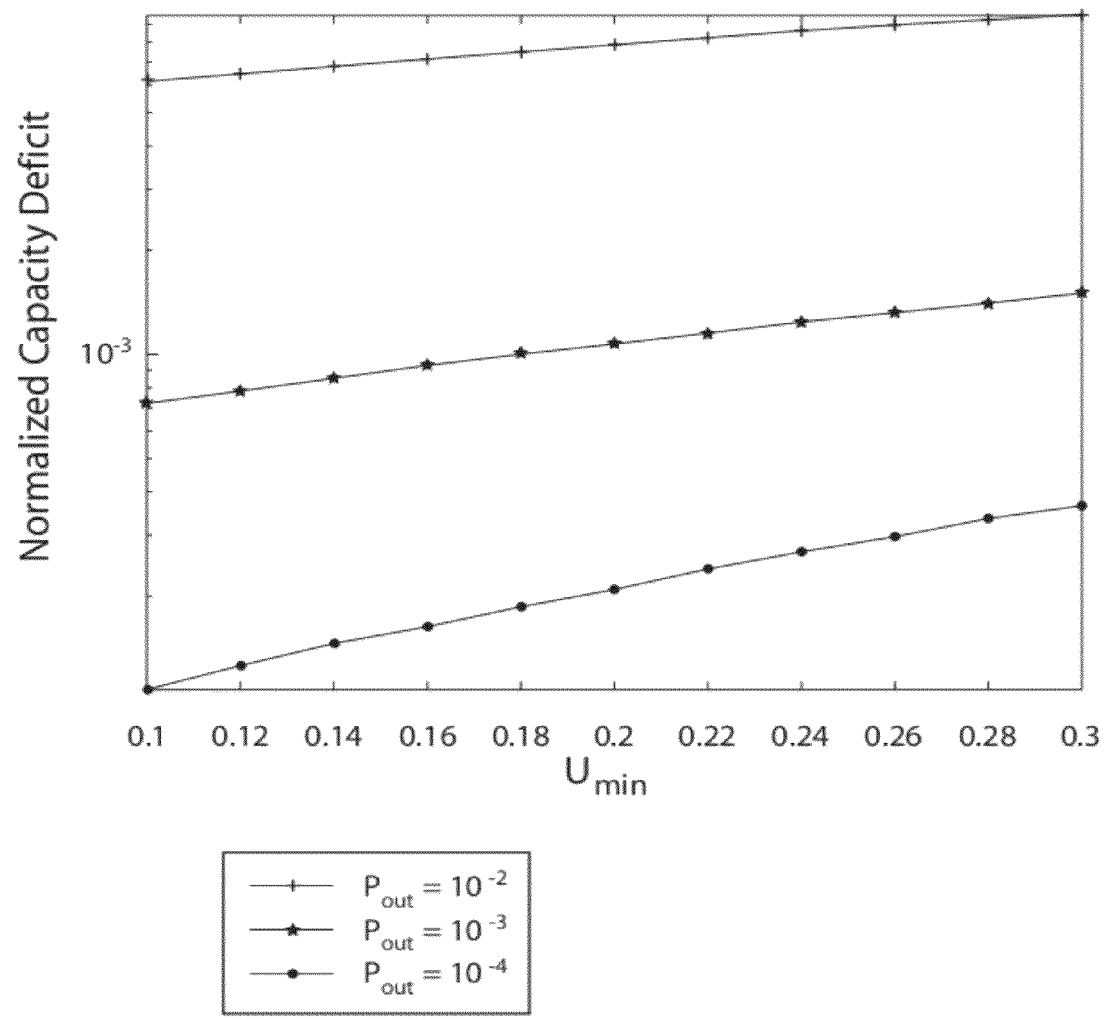
FIG. 9 is a graph of exemplary capacity deficits versus a minimum level of access point activity.

FIG. 9 is from the same system and shows the effect of $U_{MIN}$ on capacity deficit. As the minimum required capacity increases, the control algorithm reacts more aggressively, which results in higher capacity deficits. This is due to the fact that when $U_{MIN}$ is higher, more power saving must be done in advance to ensure that the minimum capacity requirement can be obtained. In the 0.1% outage case the capacity deficit increases by a factor of roughly 4 when the minimum capacity goes from 10% to 30%. Even at this latter value however, the capacity that is withheld is far less than 1%.

Figure 10:
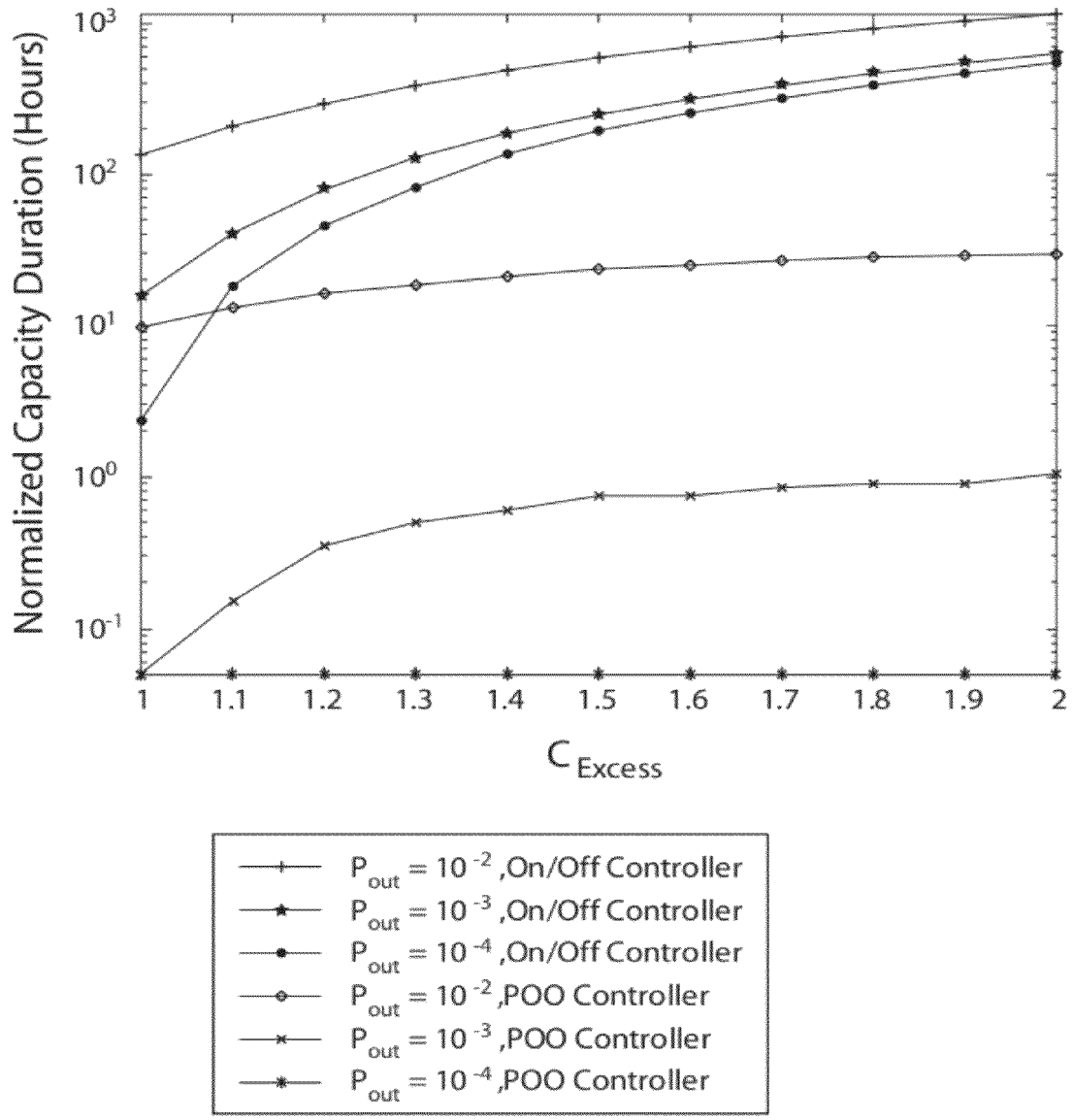
FIG. 10 is a graph of duration of exemplary minimum offered capacity versus an excess loading of an access point.
Figure 11:
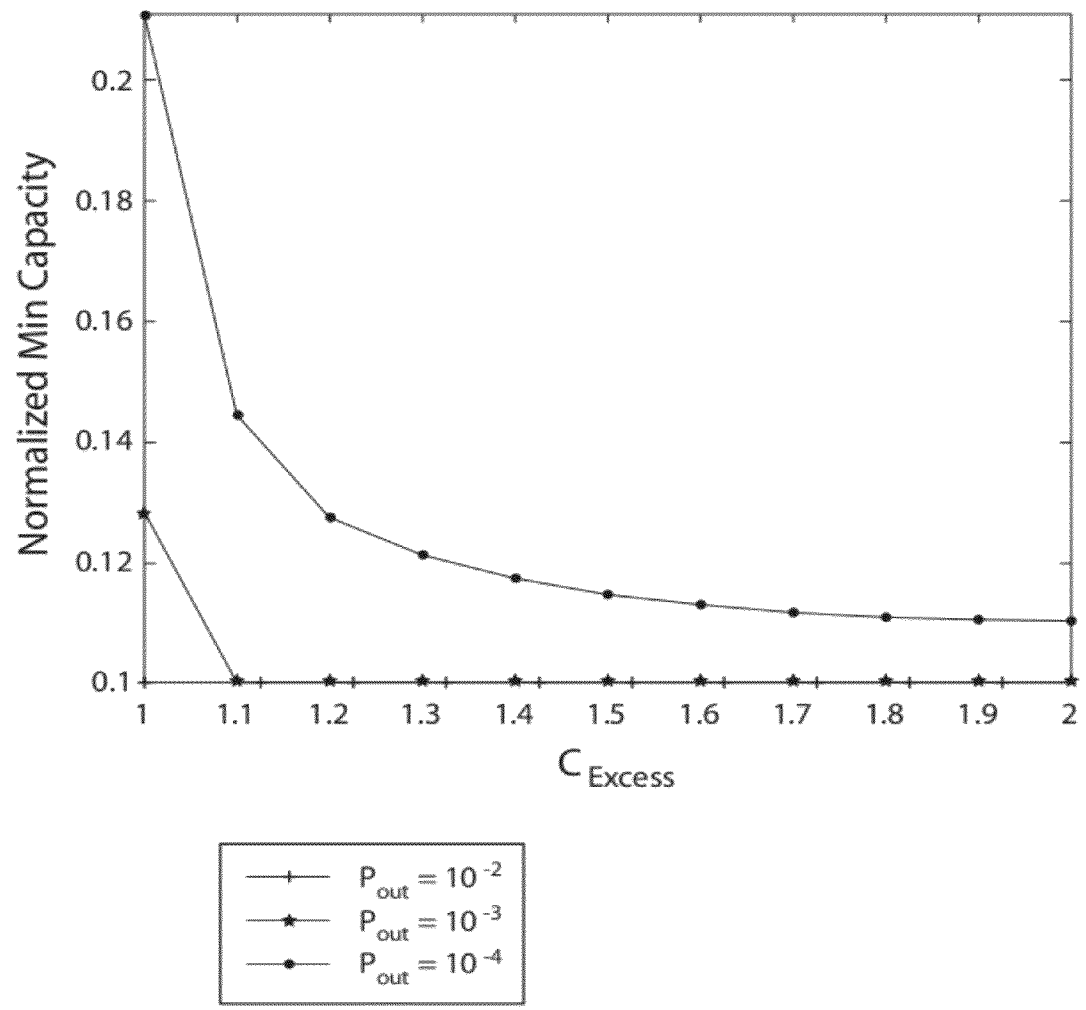
FIGS. 11 and 12 are graphs of exemplary minimum offered capacity versus an excess loading of an access point.

A potential advantage of the proportional control is that it is less abrupt. In order to help characterize its performance we measured the minimum offered capacity and the length of time per year during which that capacity is offered. In FIG. 10 this duration is shown for on/off control for different excess loading, assuming $P_{MAX}=2$ W. It can be seen that even at an excess capacity of 2, the minimum capacity is offered only about 5% of the time. Under on/off control the offered capacity takes on two values, 1 or $U_{MIN}$. When gradual capacity deficit control is used this parameter is no longer discrete and can assume any value in the range, $[U_{MIN} \ldots 1]$. The corresponding graphs for the gradual capacity deficit control case are also shown in FIG. 10. It can be seen by comparing the two types of control that the time spent offering minimum capacity is far lower for the gradual capacity deficit controller compared with on/off control alone. This gives some additional indication that gradual capacity deficit control is less abrupt when it is withholding capacity. For the $10^{-4}$ target outage case, FIG. 10 shows that the gradual capacity deficit controller never offered capacity at the minimum value. FIG. 11 also shows the actual minimum offered capacity as a function of excess load. It can be seen that in the higher outage design cases the minimum offered capacity drops very quickly to $U_{MIN}$. However, in the $10^{-4}$ case the proportional control is enough to prevent that minimum level of offered capacity.

Figure 12:
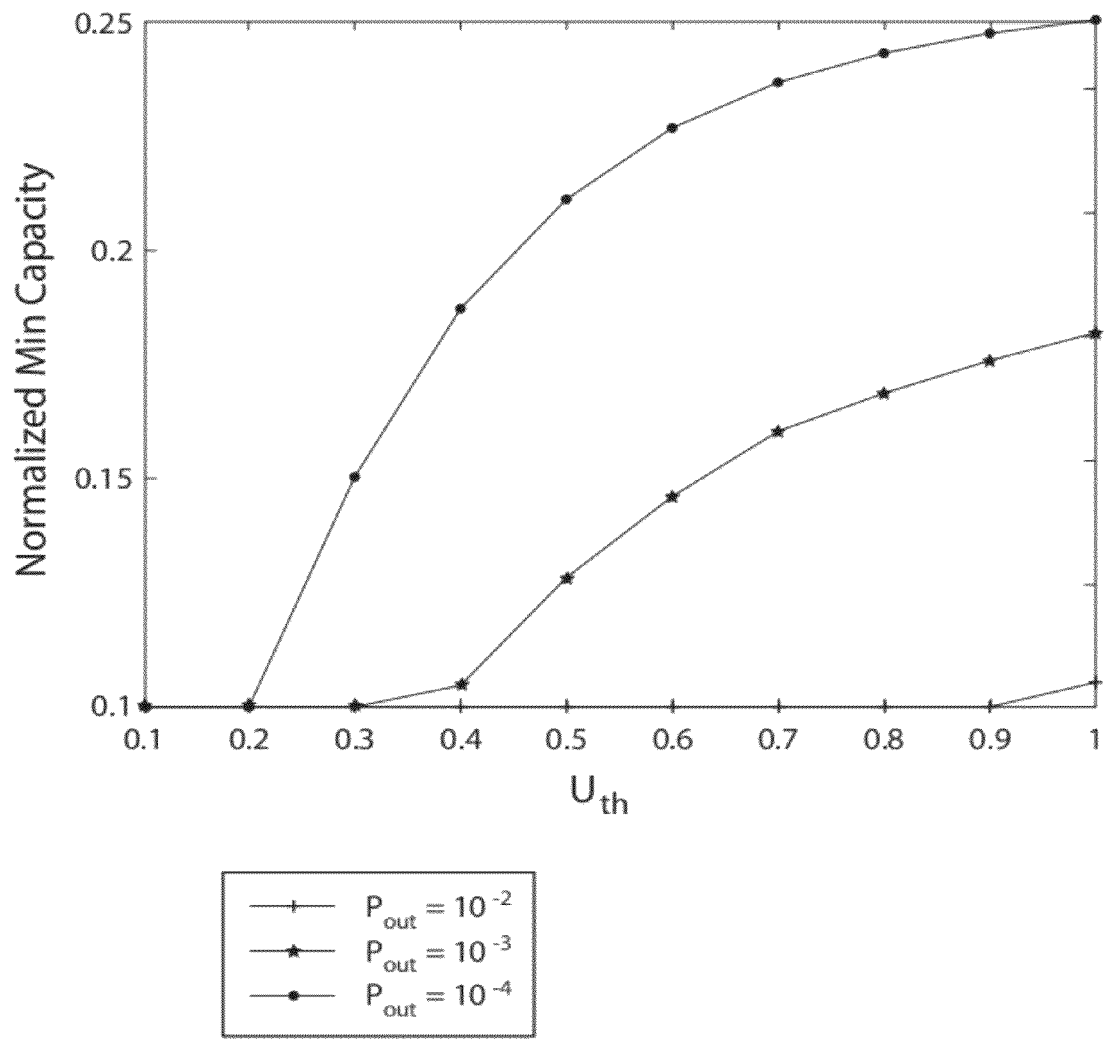
Figure 13:
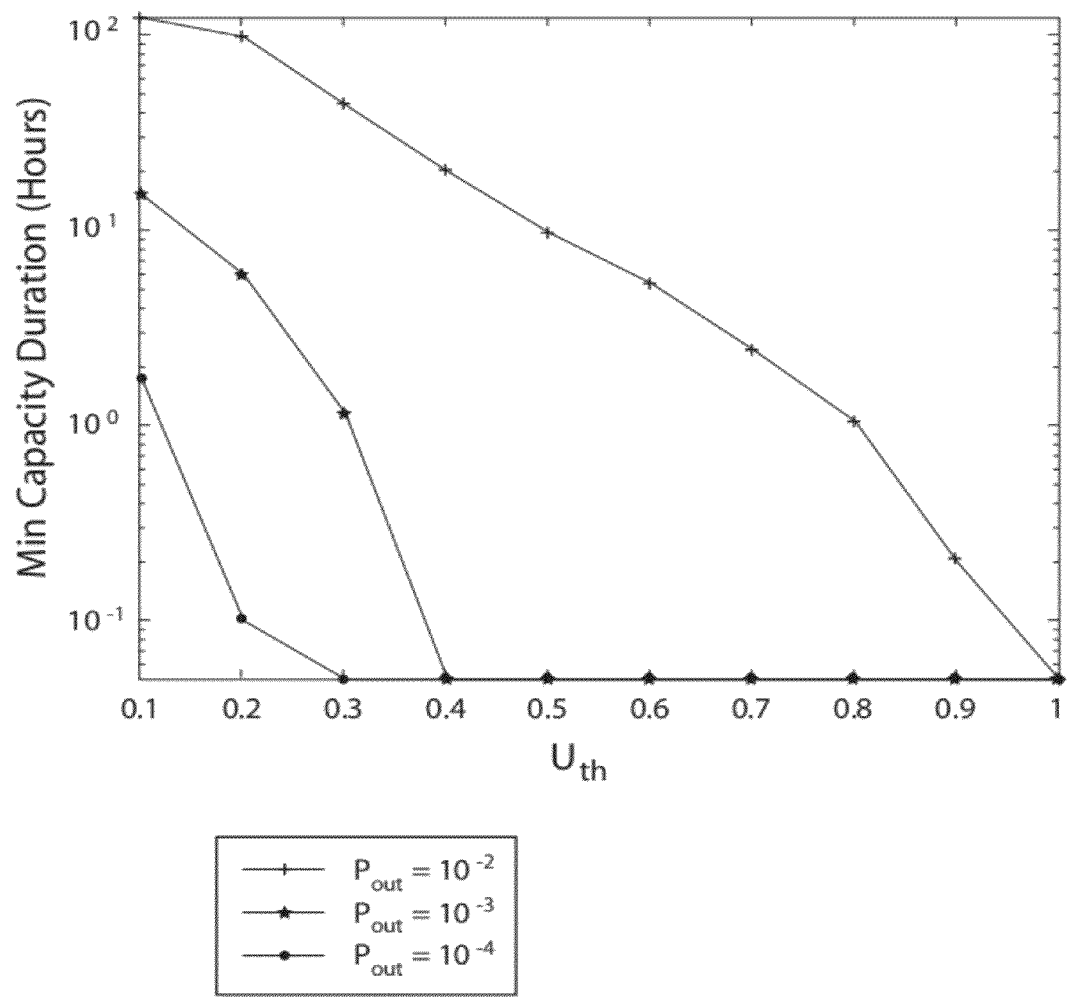
FIG. 13 is a graph of duration of exemplary minimum offered capacity versus a minimum level of access point activity.

FIGS. 12 and 13 show the minimum capacity and its duration for different gradual capacity deficit control thresholds. As the control threshold is increased, the minimum offered capacity also increases since the controller is more aggressively imposing a capacity deficit. For a design outage probability of $10^{-4}$, the minimum offered capacity reaches 25%. At the same time, FIG. 13 shows that the total duration that this minimum capacity is offered drops very quickly. These graphs suggest that if small amounts of capacity deficit are not critical, then it may be advisable to choose large control thresholds.

The power saving design methodology is statistical, in that the nodes are designed for a target activity factor which may not be met in practice. For this reason a control algorithm was proposed which can reduce outage by dropping the offered capacity when needed. The effectiveness and performance of this control was characterized. It was shown that the algorithm can prevent outage even when loading greatly exceeds the design values. Gradual capacity deficit control was shown to more gracefully add capacity deficit to the system, and can result in larger minimum deficits.

Performance Results—Dynamic Access to Meteorological Data

In the results presented below, twenty years of data for the city of Toronto, Canada were used. The data from odd-numbered years was used for the actual system simulation, and the data from even-numbered years was used in the weather simulations. The experiments were repeated for $P_{OUTAGE}=10^{-2}, 10^{-3}$ and $10^{-4}$. The prediction window W was set to 24 hours, $L_{TH}$ to 10%, and $U_{MIN}$ to 0.1 W.

Figure 14:
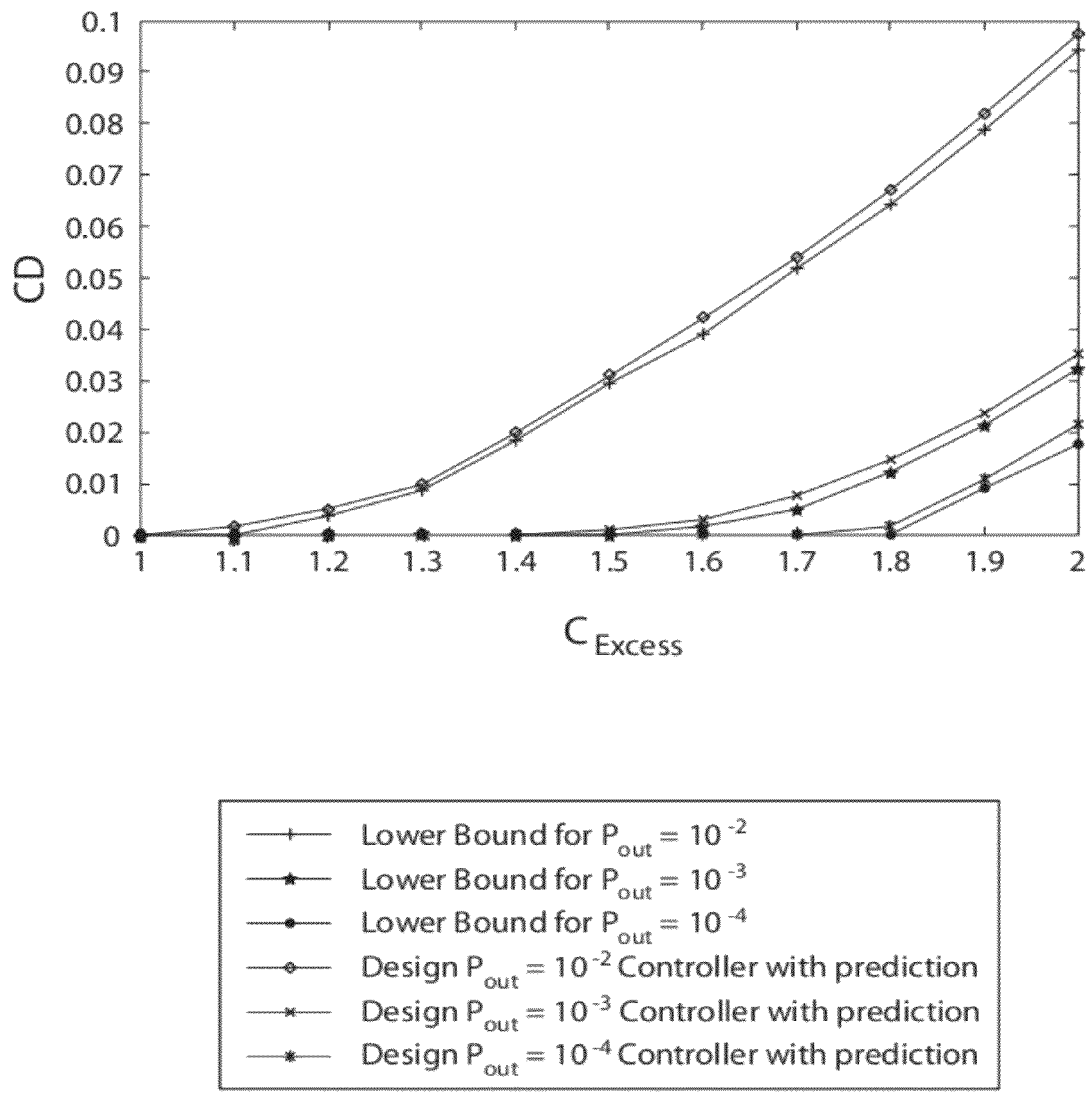
FIG. 14 is a graph of exemplary capacity deficits versus an excess loading of an access point.
Figure 15:
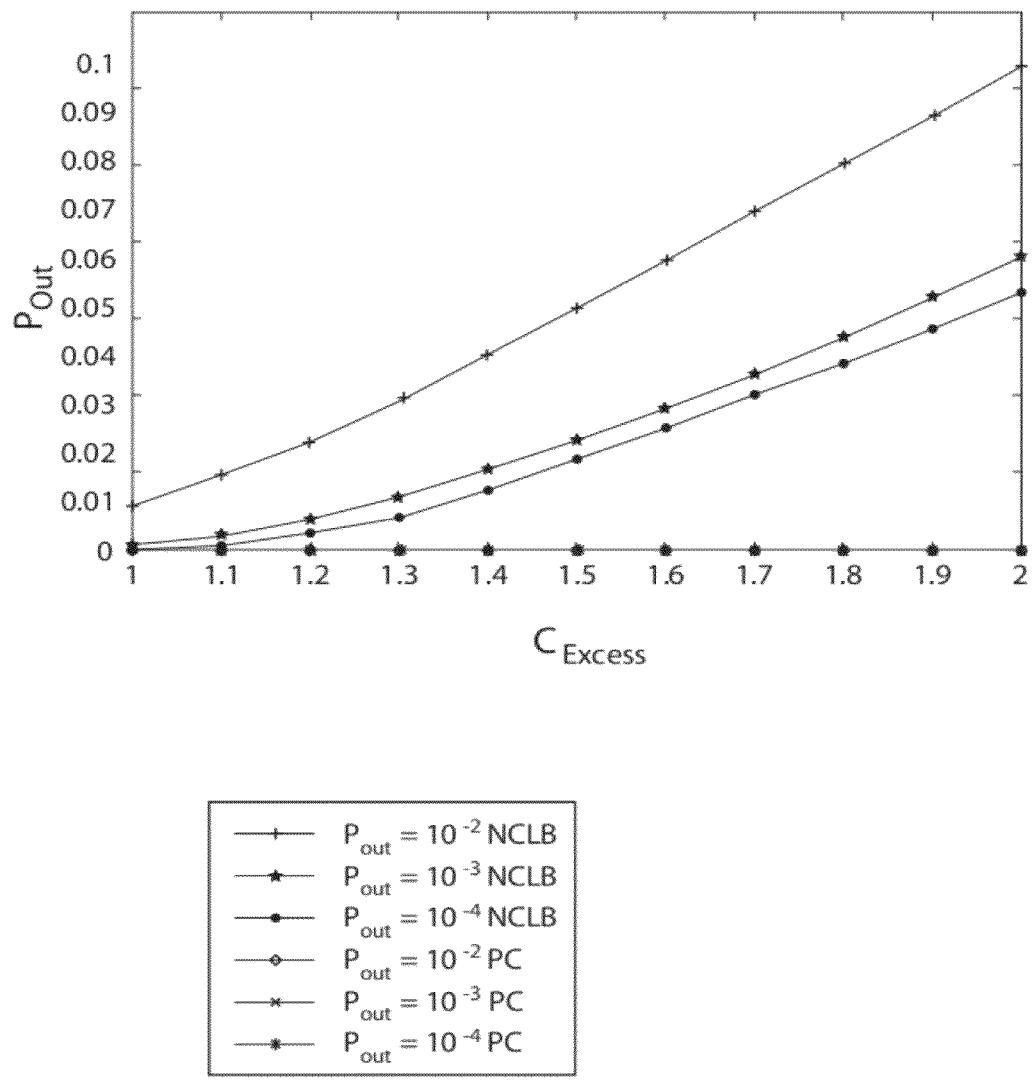
FIG. 15 is a graph of exemplary outage probability versus an excess loading of an access point.

FIGS. 14 and 15 show the results of these experiments. The simulations assume an initially half-full battery for a 3000 hour run for the city of Toronto. It was assumed that the system was allocated enough resources (battery and panel) for nominal 2 W operation, therefore the excess load is $C_{EXCESS} \cdot 2$ W.

FIG. 14 plots the capacity deficit versus the excess load applied to the system. In the figure, the capacity deficit for the control scheme is compared to a theoretical lower bound on the capacity deficit and to the case where no power saving is performed. Although the scheme cannot achieve the theoretical lower bound, it tracks the bound well. In addition, the values are quite close. For example, the capacity deficit for $P_{OUTAGE}=10^{-2}$ for the control scheme is around 0.11 while it is equal to 0.0865 for the no power saving case and 0.0868 for the theoretical lower bound.

FIG. 15 plots the outage probability versus the excess load for the control scheme, a theoretical lower bound, and the case where no power saving is performed. The results indicate that the control scheme has successfully eliminated the outage events. On the other hand, the outage probability for the no power saving case goes up from 0.01 to 0.125 for the $P_{OUTAGE}=0.01$ case, which is a significant increase.

Mesh Node Structure

Figure 16:
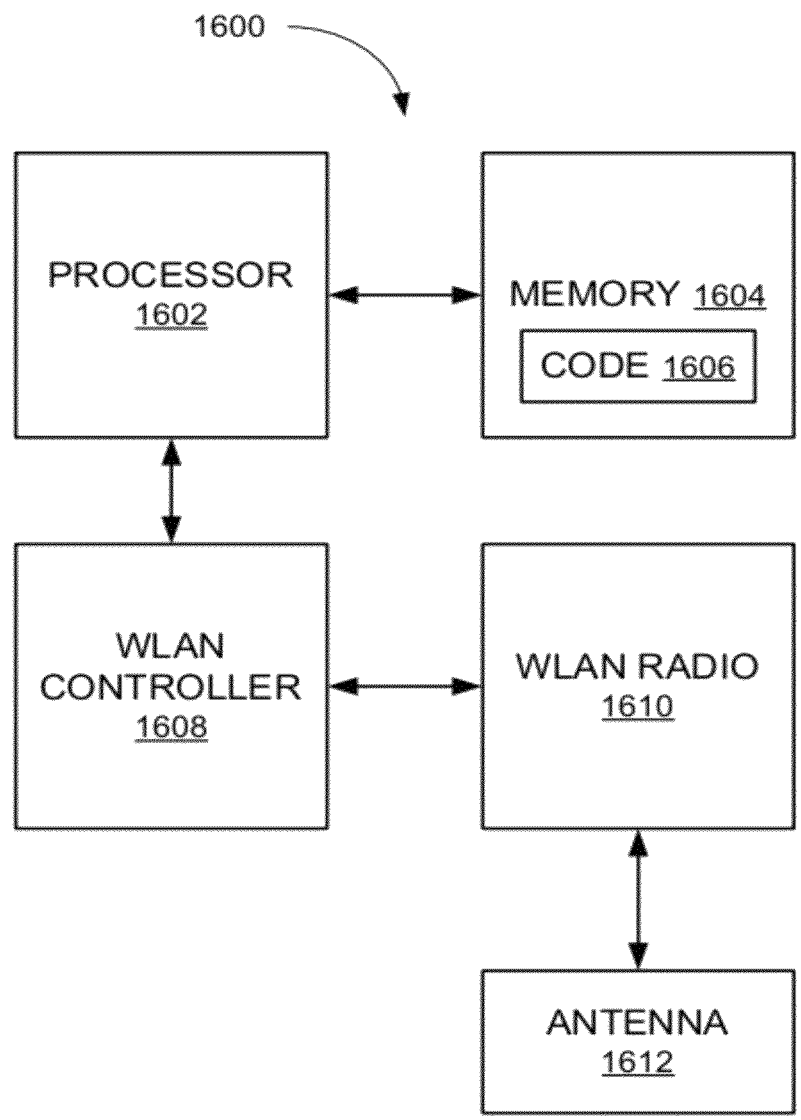
FIG. 16 is a block diagram of an exemplary WLAN infrastructure mesh node.

FIG. 16 is a block diagram of an exemplary mesh node 1600, for example, mesh node 108. Mesh node 1600 comprises a processor 1602, and a memory 1604 coupled to processor 1602. Code 1606 stored in memory 1604 enables mesh node 1600 to implement the methods and algorithms and control schemes described hereinabove.

Mesh node 1600 comprises a WLAN controller 1608 coupled to processor 1602, a WLAN radio 1610 coupled to WLAN controller 1608, and an antenna 1612 coupled to WLAN radio 1610. WLAN controller 1608 and WLAN radio 1610 are compatible with one or more WLAN communication standards, for example, IEEE 802.11 standards and/or ETSI HiperLAN standards.

Mesh node 1600 may comprise other components that are not shown in FIG. 16. For example, mesh node 1600 may comprise more than one WLAN radio and more than one antenna.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Appendix-Solar Radiation Data and Models

The performance results described hereinabove use solar irradiation data from two different North American sources. Data for many locations in the United States is available from the National Solar Radiation Data Base (NSRDB), National Renewable Energy Laboratory (NREL), U.S. Department of Energy. In Canada, data is obtained from the National Climate Data and Information Archive, The Meteorological Service of Canada (MSC). The NREL data provides insolation records including global horizontal solar irradiance, direct normal solar irradiance and diffuse horizontal solar irradiance for each hour from Jan. 1, 1961 through Dec. 31, 1990 for 239 different sites. In addition to the fields mentioned above, to assist in using solar conversion models, two other fields are also included in the hourly records; extraterrestrial horizontal radiation and extraterrestrial direct normal radiation. The MSC records contain similar data for 148 Canadian locations. These records, in addition to the traditional fields, contain temperature, sky condition, station pressure records, etc.

Five different solar irradiation fields are used from the data. These are, extraterrestrial horizontal radiation, extraterrestrial direct normal radiation, global horizontal radiation, direct normal radiation, and diffuse horizontal radiation. The first two fields are deterministic and can be calculated using the sun-earth distance and position equations, but the rest of the fields are samples of random processes due to complex weather processes such as humidity air pressure and cloud type cover.

In most PV applications, fixed panels are pointed directly south and sloped slightly greater than the geographic latitude so that solar absorption is highest during winter months. Meteorological data however, is only available for horizontal and fully-tracking (direct normal) components and cannot be used directly for a fixed planar solar panel. For this reason a conversion model is used to compute the energy incident on the panel. The direct component calculation is a straightforward problem, as described in "Comparison of calculated and measured values of total radiation on tilted surfaces in Dhahran, Saudi Arabia", M. A. Abdelrahman and M. A. Elhadidy, Solar Energy, 37:239-243, 1986. The diffuse component estimation requires a more complex computation and the most widely accepted model was used, as described in R. Perez and R. Stewart, "Solar irradiance conversion modules", Solar Cells, 18:213-222, 1986. The ground-reflected component is not considered in these results since it is highly site-dependent and detailed knowledge of the "surrounding ground albedo" is required. Typically this component is a small fraction of the total and does not significantly contribute to total solar insolations. However, when it is present the results described hereinabove can be considered to be a worst-case underestimation.

What is claimed is:

1. A mesh node of an infrastructure wireless local area network 'WLAN', the mesh node comprising:
   an antenna;
   a WLAN radio coupled to the antenna;
   a WLAN controller coupled to the WLAN radio;
   a processor coupled to the WLAN controller;
   a memory coupled to the processor, the memory storing code which, when executed by the processor, controls the WLAN controller to withhold communication services for one or more periods of time a cumulative duration of which is related to power consumption of the mesh node when handling an admissible load, where the admissible load was determined from simulations of a system comprising the mesh node, a battery coupled to the mesh node, and a device coupled to the battery that is able to harness energy from a source of renewable energy, and where the simulations involve meteorological data related to the source of renewable energy in a vicinity of the mesh node,
   wherein the admissible load was determined to preserve sufficient energy in the battery so that the mesh node is able to provide at least a prescribed minimum level of activity subject to a target outage probability.

2. The mesh node as claimed in claim 1, wherein the meteorological data comprises historical meteorological data.

3. The mesh node as claimed in claim 1, wherein the meteorological data comprises forecasted meteorological data.

4. The mesh node as claimed in claim 1, wherein the source of renewable energy is the sun, the device comprises one or more solar panels, and the meteorological data is solar insolation data.

5. The mesh node as claimed in claim 1, wherein the simulations are conducted over a window of prediction starting from a particular time, the admissible load is determined for a time increment starting at the particular time, and the communication services are withheld during the time increment.

6. The mesh node as claimed in claim 1, configured to provide, via the WLAN controller and the WLAN radio, an indication of the current state of charge of a battery currently coupled to the mesh node to a server having access to the meteorological data.

7. The mesh node as claimed in claim 6, configured to receive from the server, via the WLAN radio and the WLAN controller, an indication of the admissible load.

8. The mesh node as claimed in claim 6, configured to receive from the server, via the WLAN radio and the WLAN controller, an indication of the cumulative duration.

9. The mesh node as claimed in claim 6, configured to receive from the server, via the WLAN radio and the WLAN controller, indications of the one or more periods of time.

10. A non-tangible computer-readable medium storing instructions which, when executed by a computer, result in:
   accessing meteorological data related to a source of renewable energy in a vicinity of a mesh node of an infrastructure wireless local area network 'WLAN';
   receiving from the mesh node an indication of the current state of charge of a battery coupled to the mesh node;
   conducting simulations of a system comprising the mesh node, the battery, and a device coupled to the battery that is able to harness energy from the source of renewable energy, the simulations involving the meteorological data;
   determining an admissible load for the mesh node from the simulations; and
   providing the mesh node with information according to which the mesh node is able to withhold communication services for one or more periods of time a cumulative duration of which is related to power consumption of the mesh node when handling the admissible load.

11. The non-tangible computer-readable medium as claimed in claim 10, wherein accessing the meteorological data comprises accessing the meteorological data via the Internet.

12. The non-tangible computer-readable medium as claimed in claim 10, wherein the meteorological data comprises historical meteorological data.

13. The non-tangible computer-readable medium as claimed in claim 10, wherein the meteorological data comprises forecasted meteorological data.

14. The non-tangible computer-readable medium as claimed in claim 10, wherein the source of renewable energy is the sun, the device comprises one or more solar panels, and the meteorological data is solar insolation data.

15. The non-tangible computer-readable medium as claimed in claim 10, wherein the simulations are conducted over a window of prediction starting from a particular time, the admissible load is determined for a time increment starting at the particular time, and the communication services are withheld during the time increment.

16. The non-tangible computer-readable medium as claimed in claim 10, wherein determining the admissible load comprises determining the admissible load to preserve sufficient energy in the battery so that the mesh node is able to provide at least a prescribed minimum level of activity subject to a target outage probability.

17. The non-tangible computer-readable medium as claimed in claim 10, wherein the information comprises an indication of the admissible load.

18. The non-tangible computer-readable medium as claimed in claim 10, wherein the information comprises an indication of the cumulative duration.

19. The non-tangible computer-readable medium as claimed in claim 10, wherein the information comprises indications of the one or more periods of time.

\* \* \* \* \*